Feb. 6, 1934.    E. W. REMBERT    1,945,534
METHOD OF PRODUCING REACTIONS WITH SILICA AND PRODUCTS THEREOF
Filed April 10, 1931
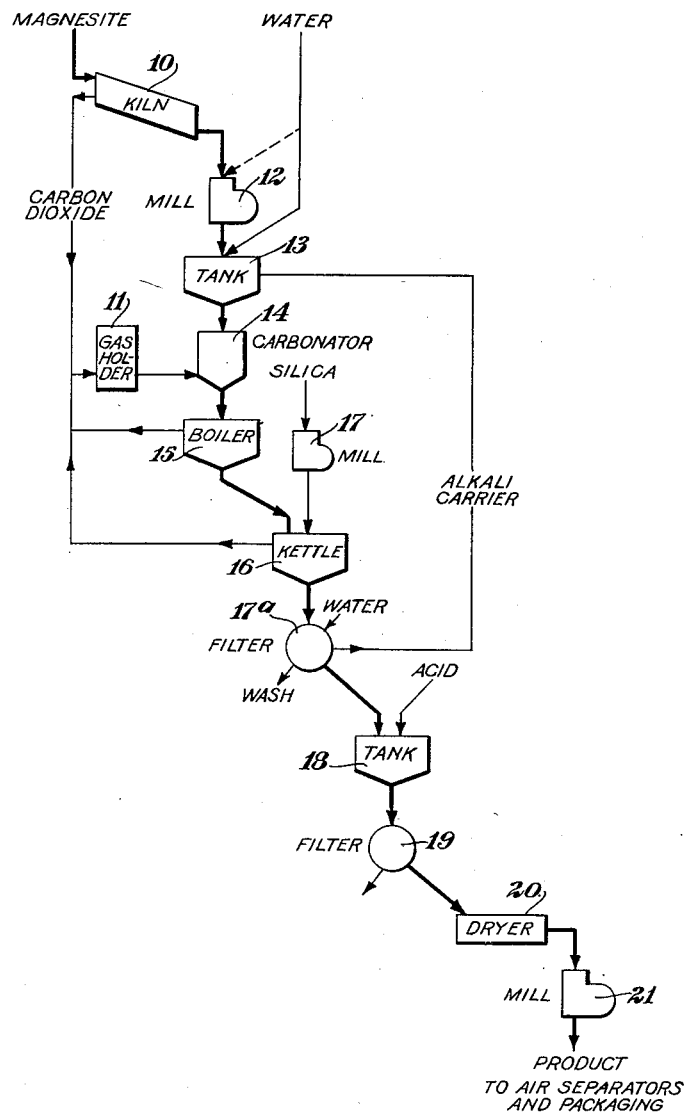
INVENTOR.
Ernest W. Rembert.
BY D. N. Halstead
ATTORNEY.

Patented Feb. 6, 1934

1,945,534

UNITED STATES PATENT OFFICE 1,945,534

METHOD OF PRODUCING REACTIONS WITH SILICA AND PRODUCTS THEREOF

Ernest Wayne Rembert, Plainfield, N. J., assignor to Johns-Manville Corporation, New York, N. Y., a corporation of New York Application April 10, 1931. Serial No. 529,269

22 Claims. (Cl. 23—110)

This invention relates to a method of producing silicates and particularly relates to a method of promoting chemical reactions between silica or silicious materials and sparingly soluble basic compounds such as the oxides and carbonates of the alkaline earths and amphoteric metals such as, for example, zinc, aluminum, iron, etc. More particularly the invention is directed toward a method of producing hydrous or hydrated silicates in a rapid, facile and economical manner. Furthermore, the invention also pertains to hydrated silicates having particularly desirable characteristics which render them useful as adsorptives.

The products produced in accordance with the methods of this invention are not liquid products such as, for example, water glass, or sodium silicate, but instead are solid finely divided products exhibiting a porous structure of large surface area, although under some conditions of preparation the particles may also be gelatinous in character.

It is known that silica will react with alkalies to produce soluble silicates, but this invention is primarily directed toward the production of insoluble silicates from ordinary solid silica or silicious materials and sparingly soluble basic compounds. The rate of reaction of such compounds is very slow and is influenced by the basicity of the basic compound or salt employed. The method of this invention, however, increases the rate of reaction to such a point that it is unnecessary to employ either high temperatures or high pressures in producing silicates, whereas heretofore it was thought essential to employ either very high temperatures and pressures or a prolonged heating period to promote similar reactions.

If, for example, it is desired to produce a magnesium silicate, silica may be caused to react with any alkaline magnesium compound such as, for example, magnesite or the magnesium carbonates, magnesium hydroxide or magnesium oxide. Solid silica will combine with a sparingly soluble alkaline magnesium compound of this character in the presence of water slowly although the reaction can be accelerated somewhat by high temperature and pressure. The expression sparingly soluble alkaline or basic compounds as employed herein includes not only the true bases in the strict chemical sense which are compounds containing a hydroxyl radical such as basic magnesium carbonate, but also compounds which give a basic reaction in the presence of water due to hydrolysis such as normal magnesium carbonate.

In accordance with this invention, however, it is possible to produce a magnesium silicate from any of these sources of magnesia without the employment of high temperatures or pressures, and furthermore give rise to a product which has very unusual properties as regards its physical characteristics.

For instance, the silicate products of this invention may be of a hydrated type and be capable of decolorizing various liquids such as animal, vegetable and mineral oils and distillates. Other characteristics of these products such as light weight, fine and porous structure, chemical inertness, etc., make them extremely useful as fillers, reinforcing agents and stabilizing agents in rubber and bituminous compositions and emulsions, mild abrasives, etc.

In general, it is an object of this invention to disclose and provide a method for promoting chemical reactions between silica or silicious materials and sparingly soluble compounds capable of reacting therewith through the use of a basic compound of an alkali metal hereafter referred to as a silica carrier. The method has great utility in the preparation of all insoluble silicates where hydrous products are desired.

An object of this invention is to disclose and provide a method of producing hydrous silicates having decolorizing properties.

Another object is to disclose and provide a method of promoting reactions with silica in which substantial completion of the reaction or equilibrium can be reached with great rapidity.

A still further object is to disclose and provide a method by means of which a reaction between solid silica and a sparingly soluble basic compound can be greatly facilitated.

Another object is to disclose and provide a method of promoting the reaction between solid silica and a sparingly soluble basic compound in which the reaction rate is largely regulated by the rate of solution of the silica.

Another object of the invention is to disclose and provide a method of controlling reactions between solid silica or silicious material and a sparingly soluble basic compound in an alkali solution, by regulating the concentration of and quantity of alkali in such solution and thus regulating the rate of solution of the silica.

A still further object of this invention is to disclose and provide an improved method of producing solid, finely divided silicates possessing a porous structure.

An object of this invention is to disclose and provide an improved method of producing hydrous silicates or silicate gels adapted for use as decolorizing, clarifying and bleaching agents.

An object of this invention is to disclose and provide, as articles of commerce, granular or finely divided silicate adsorbents having a minimum amount of unreacted material associated therewith and which produce a desired decolorization of oils and other liquids with an adsorption of but a very small quantity of the liquid treated.

A further object of this invention is the provision of a method whereby complete reaction between solid silica and a sparingly soluble basic compound may be attained.

These and other objects, uses and advantages of this invention will become apparent to those skilled in the art from a contemplation of the invention described and embodied herein, and will be obvious from the detailed discussion of the invention and examples thereof mentioned hereinafter.

In describing the invention, reference will be had, for the purpose of illustration, to the accompanying diagrammatic representation of one particular embodiment of the process embraced by this invention as it may be employed in the manufacture of silicates from sparingly soluble basic compounds.

The method of this invention may employ any desired form or source of silica. For example, the silica may be in the form of finely divided sand or quartz, or the silica may be amorphous, hydrated or opaline. The hydrated, amorphous and opaline varieties of silica have ordinarily a relatively great specific surface and are more reactive than crystalline silica. Silicious materials such as silicious clays, as well as certain natural silicious materials (including volcanic ash, silica, residues, Tripoli, kaolin, talc, zeolites, etc.) may also be employed, although not as effectively as the purer forms of silica. Diatomaceous silica (kieselguhr, diatomite or infusorial earth) is a readily available source of highly reactive amorphous silica suitable for use in the methods of this invention. Other examples of highly reactive silica are silica gel and the porous silica residues obtained from the combustions of organic matter such as rice hulls.

It has been found that solid silica of the character described hereinabove may be made to react with any sparingly soluble basic compound particularly those of the alkaline earth group. Illustrative of this latter group of ingredients, reference may be had to various compounds or sources of barium, calcium, strontium and magnesium. Amphoteric metals and their compounds capable of reacting with silica such as, for example, the compounds of aluminum, zinc, beryllium, chromium, tin, lead and iron may also be treated in accordance with the invention so as to produce silicates of these metals.

A distinguishing characteristic of this invention lies in the employment of a carrier for the silica, such carrier being preferably an alkali compound. By the use of such carrier, the reaction rate may be greatly accelerated and readily controlled, thus making the rate of reaction substantially independent of the solubility or basicity of the basic compound which it is desired to transform into a silicate. Sodium hydroxide and sodium carbonate or soda ash are illustrative of compounds which may be employed as carriers. The invention provides for the recovery of such carrier for reuse in cyclic operation of the process.

The apparent mechanism of the reaction in accordance with my invention is illustrated by the following equations assuming the formation of magnesium meta-silicate from magnesium carbonate and silica and utilizing sodium carbonate as the carrier:—

$$SiO_2 + Na_2CO_3 \rightarrow Na_2SiO_3 + CO_2$$
$$Na_2SiO_3 + MgCO_3 \rightarrow MgSiO_3 + Na_2CO_3$$

The mechanism of the reaction apparently involves the solution of silica in the aqueous alkali solution and the subsequent combination of the soluble or colloidal silicate thus formed with the surfaces of the sparingly soluble basic compound. The insoluble silicate thus formed may be described as a pseudomorph of the particular sparingly soluble basic compound employed. In the above reaction it will be noted that the alkali carrier is regenerated and may be recycled in the process. The use of a carrier as above set forth is particularly applicable in this class of reaction wherein the rate of solution of the silica controls the overall rate of the reaction. Not only does the carrier increase the rate of reaction but also renders it possible to substantially complete the reaction that is, bring it to a point of complete or substantially complete equilibrium which in most instances would not be practicable without the utilization of a carrier.

A preferred method for the production of silicates in accordance with this invention consists of slurrying the silica or silicious material in a state of fine division with the sparingly soluble basic compound in a solution of alkali. This slurry is then brought to an optimum temperature, desirably the boiling point. The reaction is then allowed to proceed preferably until substantial equilibrium is established. The reacted slurry is then disposed of or separated from the liquid constituents in any desired manner, the separation of the carrier solution from the solid constituents permitting its reuse in the treatment of succeeding batches. The silica carrier or alkali increases the reaction rate in view of the fact that the rate of solution of the silica is increased. Necessarily the degree of agitation of the slurry and the temperature and pressure also control the rate of reaction to a certain extent, but the alkalinity of the solution surrounding the particles of silica or silicious material and the basic compound is highly important.

The optimum concentration of alkali base or carrier in the process of this invention will vary over a wide range, depending upon the type of hydrous silicate desired and the character of silica and basic compound employed. For example, in preparing an active hydrous magnesium silicate from a magnesium carbonate and diatomaceous silica, using soda ash as a carrier, it is not desirable to use a concentration of the latter exceeding 2N, since an unfavorable equilibrium is established beyond this point, such unfavorable equilibrium holding an appreciable quantity of silica in solution as sodium silicate. Also when reacting oxides of the amphoteric metals, such as aluminum and iron, a maximum concentration of carrier above 1N will result in an actual solution of the oxide, and a gel will be formed around the particles of silica. In general, then, the carrier concentration will be less than 2N and preferably in the range of 0.5N to 0.25N although this range varies with the character of the basic compound utilized in the process.

After the reaction is completed to the degree desired, the solid constituents of the slurry are separated from the aqueous phase, including the carrier, in any suitable manner as for example by filtering. The solid constituents or products may then be washed with water or an acidic solution to remove or neutralize any alkaline liquor retained or absorbed by the product or to neutralize the products. Preferably the product is first washed with water and then, if desired, resuspended or reslurried in an acidified liquid and finally separated from such liquid. The washed and/or neutralized product may then be dried to a suitable degree under conditions appropriate to the treatment of the product.

The products are generally hydrous silicates and usually should only be dried sufficiently to remove mechanically contained water without the removal of water of hydration or chemically combined water in order to provide a product having a high degree of adsorptive quality. Thereafter, the products may be milled or disintegrated to any desired state of subdivision and packaged or bagged. It is to be understood that the washing, neutralizing, drying and milling steps may be materially varied or even certain of them eliminated, depending upon the character of the raw materials employed and the uses to which the product is designed.

In order to specifically illustrate the invention, the process of manufacturing an adsorptive magnesium silicate will be described in detail. As has been stated hereinbefore, any form of basic magnesia compound or silica-containing material could be employed, but for purposes of illustration, it will be assumed that as raw ingredients in the process, magnesite, diatomaceous silica and soda ash will be employed. It is to be understood that the example herein given is merely indicative of conditions, ingredients, and results, and is not to be construed as limiting this invention or its scope.

As shown in the drawing, the magnesite may be sent to a kiln or kilns 10 wherein the magnesite is calcined, carbon dioxide being conducted to suitable storage 11, if desired, wherein it may be held under pressure.

The calcined magnesite from the kiln 10 may then be ground, disintegrated or milled, as in the mill 12 which may be of any desired type. The grinding or milling may take place in the presence of water so as to form a thick slurry. The ground magnesite may then be sent to a slurry tank 13 wherein it is intimately mixed with water. As a result, a suspension of calcined magnesite in water is obtained in the slurry tank 13 and such suspension may then be sent to a carbonator or carbonators 14 supplied with carbon dioxide from the gas holder 11 or from any other suitable source. Carbonation is carried out in the carbonator 14 under conditions conducive to the formation of a magnesium bicarbonate. The solution from the carbonator 14 may then be discharged into a boiler or kettle 15 wherein the solution is boiled so as to precipitate the magnesia as basic magnesium carbonate. The reacting conditions maintained in the kettle 15 are preferably such as to precipitate the basic carbonate in a highly porous form having a very high specific surface. For instance, the basic carbonate produced in the same manner as that commonly followed in manufacturing this compound for heat insulation purposes represents a satisfactory product for use in the present process. However, it is desirable in some instances to alter the reacting condition from those ordinarily maintained in such manufacture to produce a basic carbonate for use in the practice of the invention having an even greater specific surface. Carbon dioxide evolved during the boiling may be returned to the gas holder 11.

The basic magnesium carbonate from the boiler 15 may then be charged into a suitable kettle, autoclave or digestion vessel 16. Such kettle or other suitable form of apparatus is also supplied with a form of silica such as, for example, diatomaceous silica, which may be first ground to a state of fine division in a suitable mill 17. Preferably, the silica supplied to the kettle 16 is ground, pulverized or disintegrated to an extent sufficient to facilitate the reaction, for example, until not more than about 15% remains on a 200 mesh sieve.

It has been found that if it is desired to manufacture a hydrous magnesium silicate, which is an unusually effective adsorbent, it is desirable to employ a sparingly soluble basic magnesium compound having a porous structure and a high specific surface such as may be produced by precipitating the compound under suitable conditions as for example a precipitated magnesium carbonate. It is for this reason that the magnesite has been calcined, slurried, carbonated and boiled in the above described system. Obviously, however, any arrangement of apparatus or any other mode of operation by which a magnesium compound of the desired structure is supplied to the reaction kettle 16, will suffice.

It is to be understood that hydrous magnesium silicate can be prepared by introducing any finely divided, sparingly soluble basic magnesium compound such as magnesite, brucite or magnesium oxide into the reaction kettle 16 and products produced from such materials will also exhibit marked adsorptive and decolorizing properties but it has been ascertained that products produced from precipitated materials having a high specific surface are of much greater efficacy.

The reasons for the improved characteristics of the products produced in using precipitated compounds are probably due to the light honeycomb structure of these materials while natural magnesite and calcined magnesite are dense amorphous powders. In this connection it may be noted that calcined magnesite produces a somewhat superior product to that derived from the natural magnesite.

The differences in the physical structure of natural magnesite, calcined magnesite, and precipitated magnesium carbonate made as described above is indicated by the following typical bulk densities of these materials:

| | |
|---|---|
| Magnesite lbs./cu. ft. | 35.5 |
| Calcined magnesite lbs./cu. ft. | 41.3 |
| Precipitated magnesium carbonate lbs./cu. ft. | 7.5 |

The product, furthermore, may be termed a pseudomorph of magnesium silicate after basic magnesium carbonate or the particular magnesium compound employed.

In this connection, it is to be understood that the product need not necessarily consist wholly of a hydrous magnesium silicate; it may contain some unreacted magnesium compound and also unreacted silica.

The magnesium compounds should preferably be in a very fine state of division as, for example, passing 200 mesh.

The most active magnesium silicate products are produced by using Mg-SiO₂ molal ratios of between 0.4-1. Products of lesser effectiveness may be produced by using ratios below 0.4 and above 1.

The slurry in the kettle or digestion vessel 16 need not contain a material excess of water. It has been found, for example, that from about 0.5 to 1.0 gallon of water per pound of solids can be satisfactorily employed. Agitation in such digestion vessel may either be obtained by natural boiling or mechanical agitation at a temperature of 212° F., or both can be used. For purposes of illustration, it is assumed that the digestion vessel 16 is an open kettle and therefore the mixture therein is merely boiled and agitated mechanically. It is to be understood, however, that enclosed pressure vessels 16 may also be employed, the time of reaction being somewhat reduced whenever pressure is applied although in general pressure is not necessary. Whenever enclosed vessels are used for digestion the carbon dioxide evolved may or may not be continuously or intermittently released, as desired. The carbon dioxide may be sent to storage 11 and used in cyclic operation of the process.

The aqueous solution in the kettle 16 primarily consists of an alkali carrier of the character mentioned hereinabove. If precipitated carbonate is used in the kettle 16, the silica carrier is preferably soda ash. If sodium hydroxide were to be employed, it is immediately converted into a carbonate and therefore it is more economical to start the process with sodium carbonate. If desired the alkali carrier may be introduced into the reaction mixture in the form of an alkali silicate. This silicate would react in the initial stages of the process with the magnesium carbonate to produce magnesium silicate and a corresponding amount of sodium carbonate, and from this point on the reaction progresses in the same manner as if the alkali had been originally added in the form of the carbonate.

In general it has been found that the initial carrier-silica ratios in the reaction mixture expressed as the molal ratio Na₂O–SiO₂ preferably are less than about 0.5. A fair operating figure for the specific illustrative example is about 0.25. In an open digestion kettle 16, the boiling time may consume from about 1 to 12 hours, a very good product being obtained in from 2 to 4 hours when the optimum Mg–SiO₂ and carrier-silica ratios are employed. In this connection it may be mentioned that the sodium carbonate solution used in the illustrative example may vary in concentration from 0.02N to 2N. The preferred concentration of carrier solution for the treatment of amorphous silicas such as diatomaceous silica is from about 0.2N to 0.5N.

After digestion in the kettle 16, the mass may be sent to a filter 17a and there separated from the aqueous solution of carrier, such carrier solution being returned to the process at a suitable state. This solution is preferably returned to kettle 13 and there utilized as make-up liquor for the calcined magnesite. The solid constituents of the mass discharged from the digestion kettte 16 may be separated from the carrier solution in any suitable manner, a filter 17a being specifically mentioned because of its adaptability. After the carrier solution has been removed from the solid constituents, such solid constituents may be water washed. After the product is so washed, it is preferably neutralized. For example, it has been found that hydrated magnesium silicate gels made from diatomaceous silica and precipitated basic carbonate in accordance with the above process are enhanced in efficiency when they are treated with a dilute mineral acid such as, for example, sulfuric acid. This increase in efficiency is apparently due to the neutralization and removal of a relatively small quantity of carrier adsorbed on the surface of the hydrous silicate.

As shown in the diagrammatic representation of the process, the solid products from the filter 17a after being water washed, may be sent to a tank 18 and agitated with a predetermined quantity of dilute solution of sulfuric acid in such tank, the acid being in amount sufficient to just neutralize the alkali present. The suspension thus formed may then be sent through the filter 19, the neutralized solution being discarded and the solid product sent to a dryer 20.

In view of the fact that the product is a hydrous silicate, it has been found desirable to dry the product under conditions which do not give rise to over drying of the surface material. The product may be dried in the air, or in suitable ovens, or under vacuum but the drying is preferably not carried out to such an extent as to completely dehydrate the material but instead to merely remove the mechanically retained moisture. The chemical composition of the product has not been definitely established and it can be assumed that there are numerous hydrous magnesium silicates, the product containing one or more of the compounds belonging to this group. The hydrous silicates should not be dried sufficiently to reduce the moisture content below about 5%, it having been found that most effective decolorizing products produced in accordance with this invention are those which contain not less than about 17% by weight of water. It is to be understood that the moisture content may be completely eliminated in certain cases, where the use to which the product is to be put so requires.

As illustrative of the specific temperatures which may be employed during drying, it may be said that the product may be dried in suitable ovens at a temperature of say 250° F. for from 5 to 24 hours or it may be dried under vacuum at a temperature of say 160° F. for 20 or 30 hours.

As indicated on the diagrammatic representation of the process, the dried material may then be sent to a mill 21 wherein agglomerates formed during drying may be broken up. From the mill the product may be sent to air separators wherein a particle size classification may be had and thereafter the product sent to bagging or packaging machinery or to storage. It is to be understood that the drying and milling may be combined in one unit if it is so desired. Devices for simultaneously drying and milling dryable materials are well known in the art. In commercial use of the product, such product will preferably be suspended in or mixed with the mineral oil or other material to be decolorized and subsequently removed therefrom by filtration or centrifuging, the product being preferably milled to pass 100 mesh.

A product produced in accordance with the method specifically described hereinabove has remarkable adsorptive efficiency. If, for example, it is employed in the decolorization of hydrocarbon oils, the product is suspended in the oil to be decolorized and the temperature of the mixture then raised to a temperature sufficiently high to drive off the water of hydration present in the product, namely, to a temperature of from 300 to 400° F. but preferably above about 350° F. Considerable foaming occurs during the liberation of the water.

The mixture of oil and decolorizing product may then be cooled and a separation effected between the decolorized oil and the product. It will be found that magnesium silicate gels made in accordance with this invention adsorb 35% less material from the oil to produce a given final color than do the best grades of acid treated clays now on the market.

For example, a mineral oil derived from Pennsylvania crude having a gravity of 25.6° A. P. I. and a flash point of 545° F., viscosity at 210° F. of 152 seconds, and an original color, as determined by the Lovibond method of 140 dilute in a ½ inch cell and dark when determined by the Union colorimeter (A. S. T. M. standard) was treated with a hydrous magnesium silicate produced in accordance with this invention at the rate of 1 pound of dry material per gallon of oil. The mixture of oil and silicate was heated to a temperature of 400° F. and then immediately filtered. The oil was decolorized to a color of 4¼ in 85% naptha as determined by the Union colorimeter, the weight ratio of coloring material to silicate in the resulting filter cake being .215. In comparison, the best acid treated clay decolorizer commercially available for oil decolorization when used in a similar manner on the same oil showed a similar ratio in the filtered cake of .27.

These as well as other tests indicate that hydrous silicate produced in accordance with this invention apparently decolorize oils strictly by adsorption and without appreciable polymerization, thereby reducing the loss of oil caused by such decolorizing treatment.

The importance of this reduction in adsorption loss is evident when one considers the fact that this loss may represent from 3% to 8% of the original oil which may have a value of from 10 to 40 cents per gallon, depending on the grade thereof.

It has also been found that the hydrous silicate produced as described hereinabove, may be revivified after use in the decolorization of liquids by heating the used material at a temperature from 850 to 1000° F. Before this calcination of the spent material, it is desirable that it be first washed with a suitable solvent so as to remove as much of the oil present as possible.

Not only is the product (resulting from the operation of this invention) suitable for use in the decolorization of hydrocarbon oils such as mineral oils and distillates, but it is also applicable to the decolorization of other liquids such as, for example, sugar solutions, vegetable oils, animal oils, etc. Furthermore, the selective adsorptive characteristics of these silicates render them useful in adsorption processes applied to gases or to gas mixtures. Furthermore, the light weight of the product and its low apparent density suggest numerous uses as carrier, catalyst, reagent, etc.

The products are generally difficultly wetted with water but are easily mixed with oleaginous substances, soaps, etc. They can, therefore, be used to advantage in water-proofing compositions, as fillers, reinforcing agents and stabilizers in bituminous compositions, polishes and emulsions. The products are feebly basic, slightly hydrolyzable and substantially chemically inert. They may be used as mild abrasives, in dental preparations. Because of their refractory character, they may be used as ingredients in special high temperature bodies.

What I claim is:

1. In a method of promoting reactions between solid, finely divided silicious materials and sparingly soluble reactive compounds in the presence of water, the step of introducing an alkali into a mixture of silicious material, water and a sparingly soluble reactive compound, heating the mixture, and then separating the alkaline solution from the silicate product.

2. A method of producing hydrous silicate products comprising producing a reaction between a finely divided silicious material and a sparingly soluble reactive compound in an aqueous medium containing added alkali in sufficient concentration to accelerate the rate of solution of the silica in the aqueous medium.

3. A method of producing hydrous silicate products comprising producing a reaction between a finely divided silicious material and a sparingly soluble reactive compound suspended as a slurry in an aqueous medium containing added alkali in sufficient concentration to accelerate the rate of solution of the silica in the aqueous medium.

4. A method of producing hydrous silicate products comprising producing a reaction between a finely divided silicious material and an alkaline earth carbonate in finely divided form suspended as a slurry in an aqueous medium containing an added alkaline compound capable of reacting with silica to form a soluble silicate in sufficient concentration to accelerate the rate of solution in the aqueous medium.

5. A method of producing hydrous silicate products comprising producing a reaction between a finely divided highly reactive silica and an alkaline earth carbonate in finely divided form suspended as a slurry in an aqueous medium containing an added alkaline compound capable of reacting with silica to form a soluble silicate in sufficient concentration to accelerate the rate of solution of the silica in the aqueous medium.

6. A method of producing silicate products comprising producing a reaction between a finely divided material containing diatomaceous silica and a precipitated form of magnesium carbonate in an aqueous medium containing an added alkaline compound capable of reacting with silica to form a soluble silicate in sufficient concentration to accelerate the rate of solution in the aqueous medium.

7. A method of producing silicates comprising producing a reaction between a finely divided silicious material and a precipitated form of magnesium carbonate suspended as a slurry in an aqueous medium containing an added alkaline compound capable of reacting with silica to form a soluble silicate in sufficient concentration to accelerate the rate of solution of the silica in the aqueous medium.

8. A method of producing silicates comprising producing a reaction between a finely divided silicious material and a basic magnesium carbonate compound suspended as a slurry in an aqueous medium containing an added alkaline compound capable of reacting with silica to form a soluble silicate in sufficient concentration to accelerate the rate of solution of the silicates in the aqueous medium.

9. A method of producing silicates comprising mixing a finely divided silicious material, a sparingly soluble basic compound, and water to form a slurry, controlling the rate of reaction by introducing an alkali into said slurry to produce an alkali concentration of between 0.25N and 1N, and heating such slurry to permit the reaction to reach substantial completion.

10. A method of producing silicates comprising mixing a finely divided silicious material and a finely divided sparingly soluble basic compound with water to form a slurry, controlling the rate of reaction of said mixture by introducing an alkali into said slurry to produce an alkali concentration therein of between 0.25N to 1N, heating such slurry to permit the reaction to reach substantial completion, and then separating solid reaction products from the alkaline solution.

11. A method of producing silicates comprising mixing a finely divided silicious material and a finely divided sparingly soluble basic compound with water to form a slurry, controlling the rate of reaction of such mixture by introducing an alkali into said slurry to produce an alkali concentration of between 0.25N to 1N, the molal ratio of alkali to silica in said mixture being between about 0.25 and 0.5 to 1, and heating such slurry to permit the reaction to reach substantial completion.

12. A method of producing hydrous silicates comprising mixing a finely divided silicious material and a finely divided sparingly soluble basic compound with water to form a slurry, adding an alkaline compound capable of reacting with silica to form a soluble silicate to said slurry to produce a molal ratio of alkali to silica in said slurry of between about 0.25 and 0.5 to 1, heating such slurry to permit reaction to reach substantial completion, separating said reaction products from the alkaline solution, and washing the solid products.

13. A method of producing hydrous silicates comprising mixing a finely divided silicious material and a finely divided sparingly soluble basic compound with water to form a slurry, adding an alkaline compound capable of reacting with silica to form a soluble silicate to said slurry to produce a molal ratio of alkali to silica in said slurry of between about 0.25 and 0.5 to 1, heating such slurry to permit reaction to reach substantial completion, separating said reaction products from the alkaline solution, and neutralizing the reaction products with an acid wash.

14. A method of producing hydrous silicates comprising mixing a finely divided silicious material and a finely divided sparingly soluble basic compound with water to form a slurry, adding an alkaline compound capable of reacting with a silica to form a soluble silicate to said slurry to produce a molal ratio of alkali to silica in said slurry of between about 0.25 and 0.5 to 1, heating such slurry to permit reaction to reach substantial completion, separating said reaction products from the alkaline solution, washing the solid products, and finally drying and milling such reaction products.

15. A method of producing hydrous silicates comprising mixing a finely divided silicious material and a finely divided sparingly soluble basic compound with water to form a slurry, adding an alkaline compound capable of reacting with silica to form a soluble silicate to said slurry to produce a molal ratio of alkali to silica in said slurry of between about 0.25 and 0.5 to 1, heating such slurry to permit reaction to reach substantial completion, separating said reaction products from the alkaline solution, neutralizing the reaction products with an acid wash, and finally drying and lightly milling such reaction products.

16. A method of producing silicates comprising mixing a finely divided silicious material and an alkaline earth carbonate in finely divided form with water to form a slurry, controlling the rate of reaction of such slurry by introducing an alkali thereinto to produce an alkali concentration of between about 0.5 and 1N, heating such slurry to permit the reaction to reach substantial completion, and separating solid reaction products from the alkaline solution.

17. A method of producing silicates comprising mixing a finely divided silicious material and an alkaline earth carbonate in finely divided form with water to form a slurry, controlling the rate of reaction of such slurry by introducing an alkali thereinto to produce an alkali concentration of between about 0.5 and 1N, heating such slurry to permit the reaction to reach substantial completion, separating solid reaction products from the alkaline solution, washing the reaction products, and finally drying and milling such products.

18. A method of producing silicates comprising mixing a finely divided silicious material with a finely divided magnesium carbonate and water to form a slurry containing magnesia and silica in a molal ratio of between about 0.5 and 0.75 to 1, controlling the rate of reaction by introducing an alkali into said slurry to produce an alkali concentration of between 0.25N to 1N, heating such slurry to permit the reaction to reach substantial completion, and separating solid reaction products from the liquid components of the mixture.

19. A method of producing silicates comprising mixing a finely divided silicious material and a precipitated form of magnesium carbonate with water to form a slurry containing magnesia and silica in a molal ratio of between about 0.5 and 0.75 to 1, controlling the rate of reaction of said mixture by introducing an alkali into said slurry to produce an alkali concentration of between 0.25N to 1N, heating such slurry to permit the reaction to reach substantial completion, separating solid reaction products from the liquid components of the slurry, washing the products, and finally drying and lightly milling the products.

20. A method of producing silicates comprising mixing finely divided diatomaceous silica and a basic magnesium compound with water to form a slurry, controlling the rate of reaction of such slurry by introducing an alkali thereinto to produce an alkali concentration of between 0.25N to 1N, heating such slurry to permit the reaction to reach substantial completion, separating solid reaction products from the alkaline liquid components of such slurry, and washing the separated reaction products.

21. A method of producing silicates comprising mixing a finely divided material containing diatomaceous silica and a basic magnesium carbonate compound with water to form a slurry, controlling the rate of reaction of such slurry by introducing an alkali thereinto to produce an alkali concentration of between 0.25N to 1N, heating such slurry to permit the reaction to reach substantial completion, separating solid reaction products from the alkaline liquid components of such slurry, washing the separated reaction products, and finally drying and lightly milling the products.

22. A method of producing silicates comprising mixing finely divided silica and a precipitated form of magnesium carbonate with water to form a slurry containing magnesia and silica in a molal ratio of between about 0.5 and 0.75 to 1, introducing an alkaline carbonate into said slurry to produce an alkali concentration therein of between 0.25N to 1N, heating said slurry to permit the reaction to reach substantial completion, and then separating solid reaction products from the alkaline solution.

ERNEST WAYNE REMBERT.